US005735126A

United States Patent [19]

Schulte-Werning

[11] Patent Number: 5,735,126

[45] Date of Patent: Apr. 7, 1998

[54] COMBUSTION CHAMBER

[75] Inventor: Burkhard Schulte-Werning, Basel, Switzerland

[73] Assignee: Asea Brown Boveri AG, Baden, Switzerland

[21] Appl. No.: 625,190

[22] Filed: Apr. 1, 1996

[30] Foreign Application Priority Data

Jun. 2, 1995 [DE] Germany ........................ 195 20 291.0

[51] Int. Cl.$^{6}$ ........................ F02C 1/00

[52] U.S. Cl. ........................ 60/732; 60/39.02; 60/748; 60/755; 431/350

[58] Field of Search ........................ 60/39.02, 39.36, 60/732, 748, 749, 754, 755, 39.75; 431/350, 353, 354, 8, 9

[56] References Cited

U.S. PATENT DOCUMENTS

| | | | |
|---|---|---|---|
| 5,127,221 | 7/1992 | Beebe | 60/754 |
| 5,235,805 | 8/1993 | Barbier et al. . | |
| 5,498,155 | 3/1996 | Chyou et al. | 431/350 |
| 5,513,982 | 5/1996 | Althaus et al. | 431/350 |
| 5,593,302 | 1/1997 | Althaus et al. | 60/737 |

FOREIGN PATENT DOCUMENTS

| | | | |
|---|---|---|---|
| 0619133A1 | 10/1994 | European Pat. Off. . | |
| 1203521 | 1/1960 | France . | |
| 4034711C1 | 2/1992 | Germany . | |
| 60323 | 5/1977 | Japan | 60/732 |
| 1377636 | 12/1974 | United Kingdom . | |

*Primary Examiner*—Charles G. Freay
*Attorney, Agent, or Firm*—Burns, Doane, Swecker & Mathis, L.L.P.

[57] ABSTRACT

In a combustion chamber (100) which is designed as an annular combustion chamber and a mixing essentially comprises a primary zone (1), a mixing section (2) arranged downstream and an adjoining secondary stage (3), vortex generators (200) are fixed inside the mixing section (2), which vortex generators (200) serve to form vortices. Both the mixing section (2) and the vortex generators (200) are provided with passage openings through which mixing air (8) flows into the interior of the mixing section (2) and mixes there with the main flow (4). The quantity of the intermixed mixing air (8) is variable; it can have a supercritical or subcritical blow-out rate relative to the main flow (4), and in this connection at least film cooling of the duct walls (5, 6) and of the vortex generators (200) takes place even at subcritical blow-out rate. If a supercritical blow-out rate is taken as a basis, the mixing air (8) penetrates the marginal zones of the vortices induced by the vortex generators (200), which leads to rapid mixing of this mixing air (8) with the main flow (4).

17 Claims, 5 Drawing Sheets

F

COMBUSTION CHAMBER

BACKGROUND OF THE INVENTION

In combustion chambers of gas turbines, the hot-gas flow flowing via the corresponding burners and prepared in the mixing zone before the turbine by admixing the mass flow not flowing via the burners must as a rule be set to the temperature profile adequate for the turbine. The quality resulting from this admixing is normally controlled via the dimensioning of the cross-section and the number of air-inlet openings. These air-inlet openings, which at the same time act as mixing-air nozzles, not only provide for the requisite penetration depth of the colder air, flowing through there, into the hot-gas flow and thus produce the macroscopic turbulence necessary for rapid mixing but also simultaneously provide for an adequate uniform distribution of the colder air feed via the combustion-chamber wall. Since these two effects are actually contrary effects, for larger nozzles lead to greater penetration depth and poorer equipartition and thus to hot or cold streaks in the hot-gas flow, there are limits to the mixing uniformity achievable, which limits are reflected in an increase in the pollutant emissions and a reduction in efficiency.

SUMMARY OF THE INVENTION

Accordingly, in the case of a combustion chamber and a method of the type mentioned at the beginning, one object of the invention, as defined in the claims, is to improve the admixing quality and reduce the thermal loading of the combustion chamber; at the same time it is an object of the invention to ensure that the pollutant emissions are minimized and the efficiency is maximized.

The improvement in this admixing quality, which achieves the other objectives, is achieved by the two above-mentioned effects being separated from one another in such a way that they are each optimized when considered by themselves.

The macroscopic vortex motions in the hot-gas flow are produced by vortex-producing elements, simply called vortex generators below, which are preferably fixed to the combustion-chamber wall or combustion-chamber walls in the mixing section, downstream of the primary zone. These vortex generators serve to produce the requisite, intensive, large-scale mixing motion between hot gases and the mixing air, to be intermixed, in the form of a secondary flow, which behaves independently relative to the mixing-air stream, in contrast to the conventional procedure.

The mixing air is now fed uniformly to the hot gas via a number of small bores in the combustion-chamber wall in such a way as to aim for a supercritical blow-out rate which at the same time ensures effusion cooling. On account of the supercritical blow-out rate aimed at, the mixing air penetrates the marginal zones of the vortices induced by the vortex generators, is carried away from the wall by these vortices and accordingly rapidly mixes with the hot gases. Since the vortex generators are directly exposed to the hot gases, the adequate cooling thus achievable is an indispensable prerequisite for such a mixing section.

The effusion cooling effect is based mainly on the inner convective cooling when the mixing air passes through the passage openings and on the possible formation of a cooling-air film on the hot-gas side. If the ratio between the impulse of the mixing-air stream and that of the hot-gas flow is small enough, the flow boundary layer is not pierced on the hot-gas side by the mixing air and a cooling-air film can form in an optimum manner. If this blow-out rate exceeds a critical value, the mixing-air stream penetrates the hot-gas flow without forming a cooling-air film. In a suitable design, however, the internal wall cooling effect increases simultaneously with increasing blow-out rate in such a way that the overall cooling effect can be kept approximately constant.

In the supercritical range, the penetration depth of the mixing-air stream into the hot-gas flow near the vortex generators can be kept small, at least one order of magnitude smaller than in the case of the conventional air-inlet openings, since it merely has to be large enough that, although the mixing air penetrates the vortices, the mixing-air stream itself does not have to provide for the requisite large-scale turbulence. Therefore no large diameters are necessary and the mixing air may be fed over a large area.

The proposed mixing section can also be adapted to various load states of the gas turbine. If the pressure gradient available for the intermixing is designed to be variable, for example via an adjustable supply restrictor, the mixing-air flow to be intermixed can also be controlled. If the blow-out rate changes in the process from the supercritical to the subcritical range, the effusion cooling effect remains the same over a large load range despite a large variation in the mixing-air flow. In this way, not only is the air to be intermixed fed to the mixing process over a large area and thus the mixing quality overall increased, but the wall of the mixing section is also protected from excessive temperatures irrespective of the mixing output.

Such a variable mixing section can be used both in conventional diffusion and premix combustion chambers and in combustion-chamber concepts having graduated combustion.

Advantageous and expedient further developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1*a* illustrates an alternative embodiment of the of combustion chamber having an venturi-shaped outlet;

DESCRIPTION OF THE PREFERRED EMBODIMENTS

Figure 1:
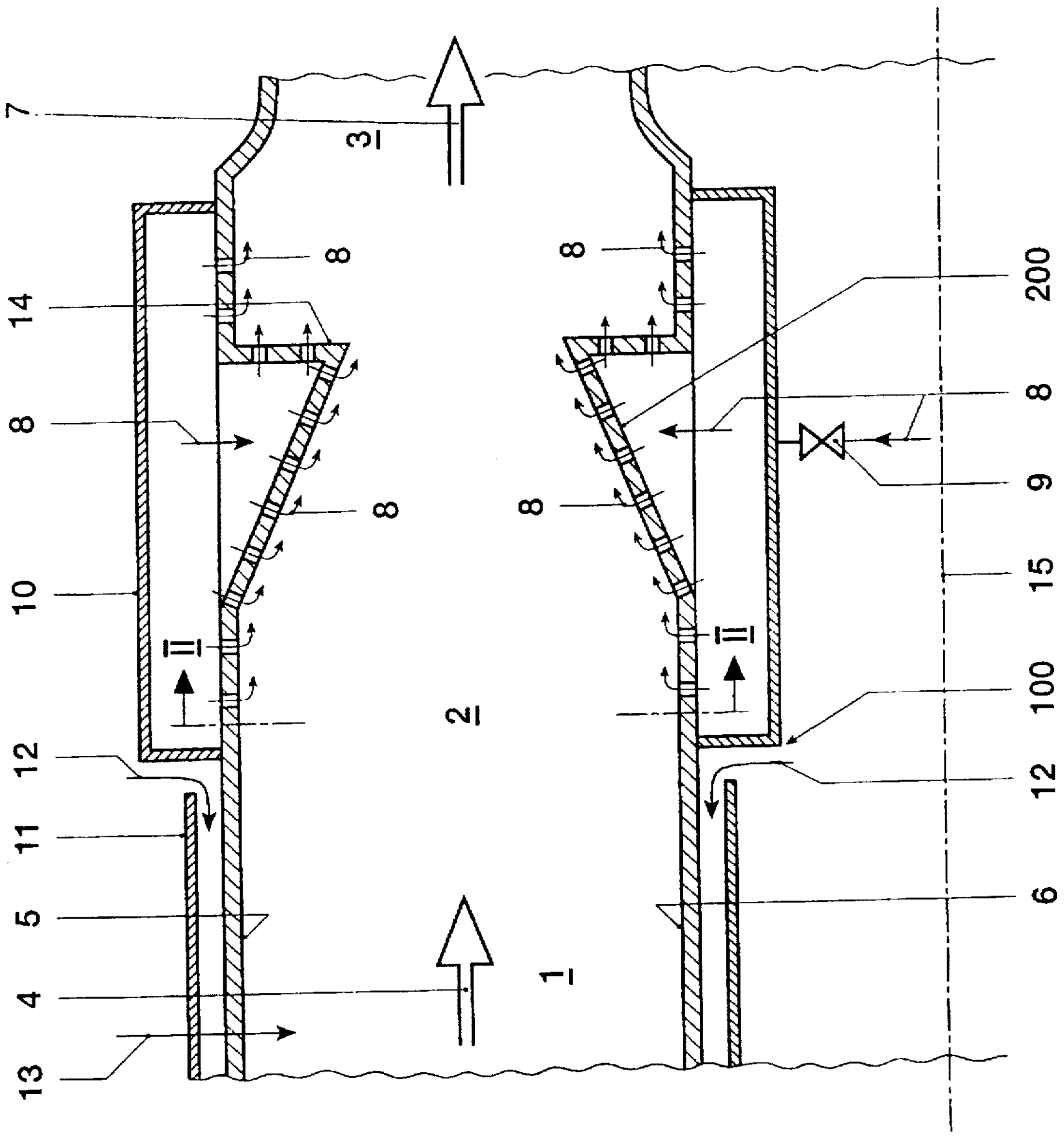
FIG. 1 shows a combustion chamber, conceived as an annular combustion chamber, having a primary zone, a mixing section and a secondary stage.

Referring now to the drawings, wherein like reference numerals designate identical or corresponding parts throughout the several views, all elements not required for directly understanding the invention have been omitted, and the direction of flow of the media is indicated by arrows.

Figure 15:
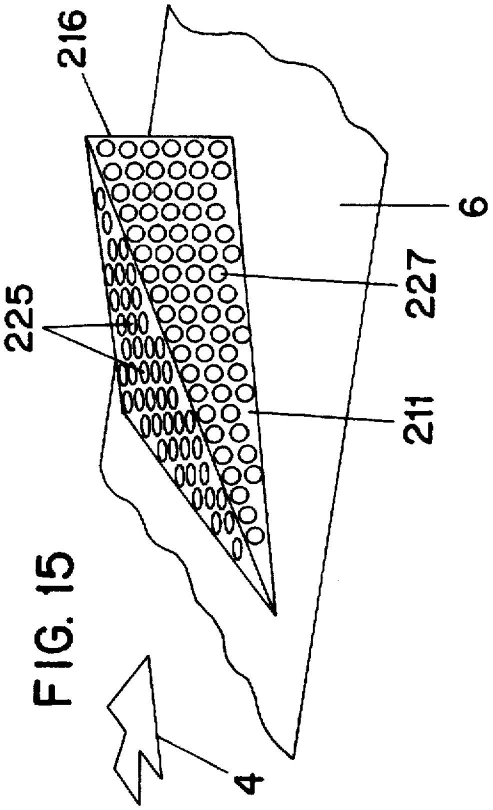
FIG. 15 shows a vortex generator perforated all round.

FIG. 1, as apparent from the shaft axis 15 shown in the drawing, shows that the combustion chamber here is an annular combustion cheer 100 which essentially has the form of a continuous annular or quasi-annular cylinder. In addition, such a combustion chamber may also consist of a number of axially, quasi-axially or helically arranged and individually self-contained combustion spaces. The combustion chamber per se may also consist of a single tube. Furthermore, this combustion chamber may be the single combustion stage of a gas turbine or a combustion stage of a sequentially fired gas turbine. In the direction of the oncoming flow, the annular combustion chamber 100 according to FIG. 1 consists of a primary combustion zone 1, which is then followed by a mixing section 2, downstream of which acts a secondary combustion stage 3, which is preferably designed as inflow to a turbine. The burner as well as the fuel feed and the primary-air feed are essentially placed at the start of the primary combustion zone 1 and are symbolized, by arrow 13 in the present FIG. 1. The primary combustion zone 1 is encased by a concentric tube 11 at a distance apart; flowing in between in the counterflow direction is a quantity of cooling air 12 which ensures convective cooling of the primary combustion zone 1. After it has passed through, this air may then go for example through the burners. The hot gases 4 from the primary combustion zone 1 flow into the mixing section 2; the inner wall 6 and the outer wall 5 of this mixing section 2 are fitted with a row of vortex generators 200 which may be arranged in different ways in the peripheral direction of the said walls. The different shapes, modes of operation and arrangements of the vortex generators 200 will be dealt with in more detail further below. In the region of the vortex generators 200, the mixing section 2 is encased by a chamber 10 into which mixing air 8 flows via control members 9 and is then distributed there via the various openings in the inner wall 6 and outer wall 5 as well as by the vortex generators 200 in order subsequently to flow into the mixing section 2. The openings referred to are apparent, for example, in FIGS. 8, 10, 12, 14 and 15; these figures will be explained in more detail further below. The mixing air 8 is actually of considerable quantity, for example up to 50% and more of the total mass flow. In the case of such a quantity of mixing air, the blow-out rate into the mixing section 2 is supercritical, for which reason a cooling film cannot actually form along the walls 5, 6. It is of course the case that the air 8 possibly intermixed decreases significantly during pronounced throttling of the mixing air 8 via the control members 9, for which reason the quantity of the hot-gas flow 4 then increases. Once this mixing-air quantity 8 reaches the subcritical blow-out rate, a cooling film then always forms along the walls 5, 6, as a result of which sufficient wall cooling is still guaranteed. The aim, however, is actually to achieve a supercritical blow-out rate in accordance with the intended use, since the mixing air 8 then penetrates the marginal zones of the vortices initiated by the vortex generators 200 arranged there. The inflowing mixing air 8 is carried away from the walls 5, 6 by these vortices, whereby it rapidly mixes with the hot gases 4 flowing through the combustion chamber 100. In addition, openings all around the vortex generators 200 (cf. FIG. 15 below) adequately cool the vortex generators 200 in the face of the hot gases 4. The supercritical blow-out rate also ensures that the penetration depth of the mixing air 8 into the hot gases 4 in the region of the vortex generators 200 can be kept small. It need only be so large that, although the mixing air 8 penetrates the vortices initiated by the vortex generators 200, the inflowing mixing air 8 does not have to provide for large-scale turbulence. For this reason, the openings also do not have a large cross-section or diameter, in which case the mixing air 8 can be introduced over a large area inside the mixing section 2. The introduction of the mixing air 8 into the mixing section 2 may of course be controlled as a function of the load of the plant. The perpendicular connecting edge (cf. 4–7, item 216) of the vortex generators 200 at the same time forms the transition from the mixing section 2 to the secondary stage 3, in which case a constriction of the mixing zone 2 results here, which then leads to a direct jump 14 in cross-section at the start of the secondary stage 3. Depending on the load state of the plant, the variable distribution of the mass flows 4, 8 causes the cooling effect of the mixing air 8 when passing through the walls to be achieved either by the heat transfer in the interior of the openings alone or in combination with the cooling film. The first case is a supercritical case having high mass flow and high supply pressure, and the second case is a subcritical case having low mass flow and low supply pressure. Accordingly, the mixing configuration thus formed is variable in the sense that the mixing-air flow 8 may be greatly dependent upon load without overheating of the material, in particular of the vortex generators 200 and the walls 5, 6, occurring. The design criterion regarding injection geometry is therefore cooling effectiveness depending only slightly on the mixing-air flow 8 over a larger range. A mixing section 2 conceived in such a way is used both in the case of graduated combustion and in burners where it is a matter of being able to operate with a constant fuel/air ratio despite a variable load.

As illustrated schematically in FIG. 1, the combustion chamber according to the invention may be arranged between two fluid-flow machines, for example, a compressor feeding compressed air to the combustion chamber and a turbine connected to receive the working gas produced. Alternatively, the combustion chamber may be placed between a low pressure turbine and a high pressure turbine.

FIG. 1*a* illustrates an alternative embodiment of an outlet 16 of the third combustion stage 3, which is shaped as a venturi and includes means 17 for injecting fuel at the narrowest constriction of the outlet.

Figure 2:
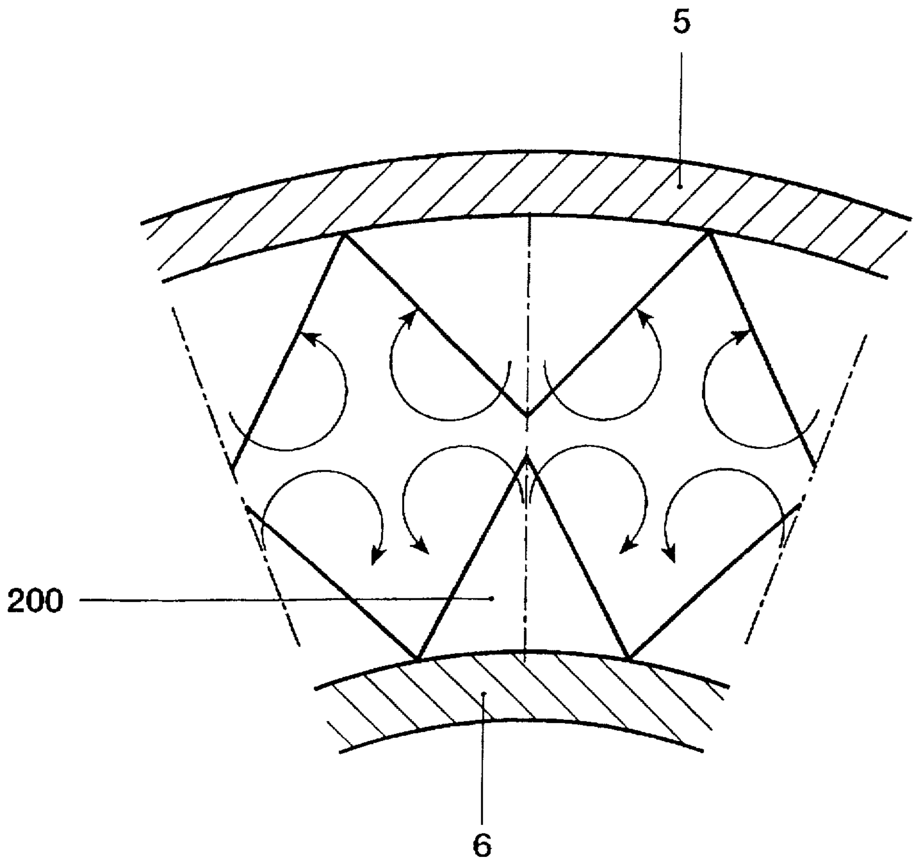
FIG. 2 shows a view along section plane II—II, the vortex generators being fixed to the inner and outer wall of the combustion chamber.

FIG. 2 is a detail from the section plane II—II in FIG. 1 and shows a configuration of vortex generators 200 which are fixed to both the outer wall 5 and the inner wall 6. They are adjacent to one another in the peripheral direction, the flow of the hot gases 4 through the clearance space being afforded by the radial spacing between the opposite points of the vortex generators 200 as well as by the intermediate spaces of the surfaces around which flow occurs freely. The curved lines apparent in this figure are intended to represent the vortices initiated by the vortex generators 200.

Figure 3:
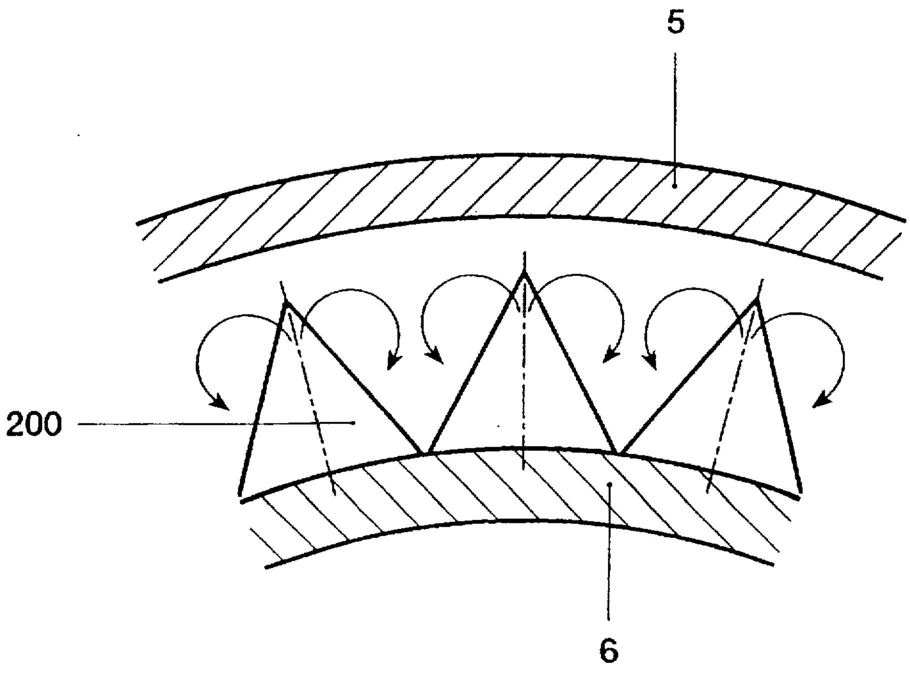
FIG. 3 shows an arrangement of the vortex generators fixed to the inner wall, FIG. 4 show a perspective representation of a vortex generator.

FIG. 3 largely corresponds to FIG. 2, the vortex generators 200 here being fixed only to the inner wall 6.

Figure 4:
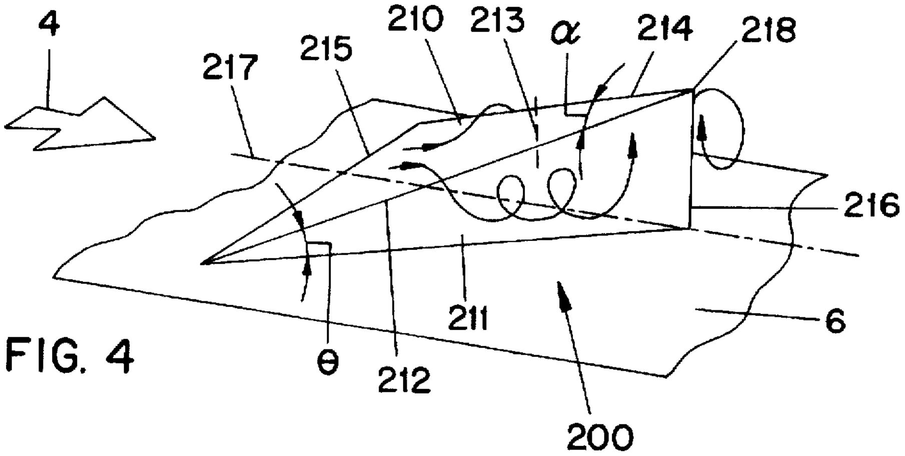
Figure 5:
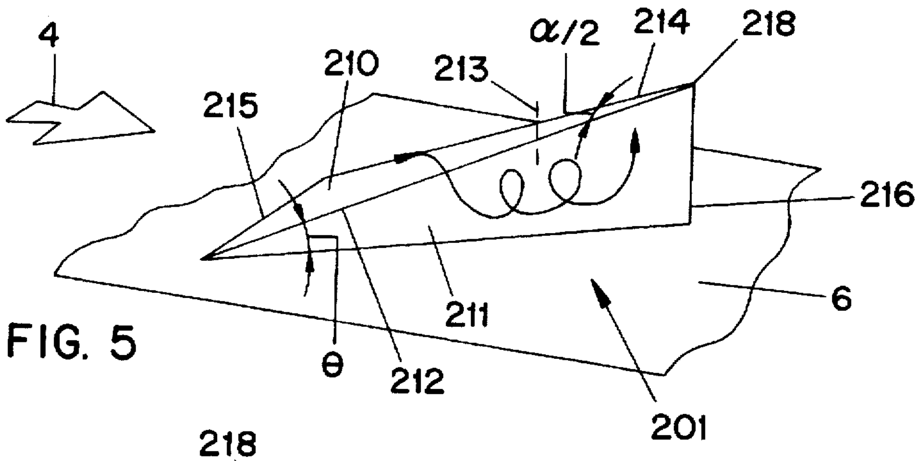
FIG. 5 shows an embodiment variant of the vortex generator.
Figure 6:
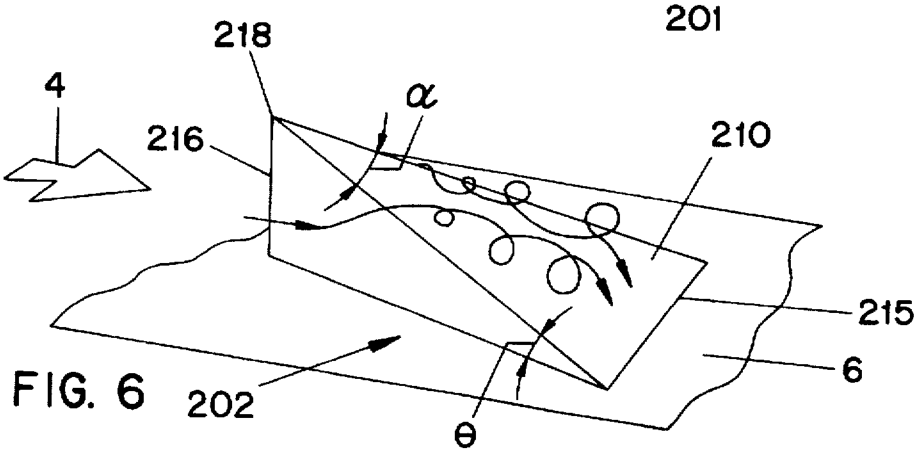
FIG. 6 shows an arrangement variant of the vortex generator according to FIG. 5.

The actual mixing section 2 is not shown in FIGS. 4, 5 and 6. However, the flow of the hot gases 4 is shown by an arrow, whereby the direction of flow is also predetermined. According to these figures, a vortex generator 200, 201, 202 essentially comprises three triangular surfaces around which flow occurs freely. These are a top surface 210 and two side surfaces 211 and 213. In their longitudinal extent, these surfaces run at certain angles in the direction of flow. The side walls of the vortex generators 200, 201, 202, which preferably consist of right-angled triangles, are fixed, preferably gastight, with their longitudinal sides at least to the duct wall 6 already discussed. They are orientated in such a way that they form a face at their narrow sides while enclosing a sweepback angle α. The face is designed as a sharp connecting edge 216 and is perpendicular to each duct wall 5, 6, with which the side surfaces are flush. The two side surfaces 211, 213 enclosing the sweepback angle α are symmetrical in form, size and orientation in FIG. 4 and they are arranged on both sides of a symmetry axis 217 which is equidirectional to the duct axis.

With a very narrow edge 215 running transversely to the duct through which flow occurs, the top surface 210 bears against the same duct wall 6 as the side surfaces 211, 213. Its longitudinally directed edges 212, 214 are flush with the longitudinally directed edges of the side surfaces 211, 213 projecting into the flow duct. The top surface 210 runs at a setting angle θ to the duct wall 6, the longitudinal edges 212, 214 of which form a point 218 together with the connecting edge 316. The vortex generator 200, 201, 202 may of course also be provided with a base surface with which it is fastened to the duct wall 6 in a suitable manner. However, such a base surface is in no way connected with the mode of operation of the element.

The mode of operation of the vortex generator 200, 201, 202 is as follows: when flow occurs around the edges 212 and 214, the main flow is converted into a pair of oppositely directed vortices, as shown schematically in the figures. The vortex axes lie in the axis of the main flow. The swirl number and the location of the vortex breakdown, provided the latter is intended, are determined by corresponding selection of the setting angle θ and the sweepback angle α. The vortex intensity or the swirl number is increased as the angles increase, and the location of the vortex breakdown is displaced upstream right into the region of the vortex generator 200, 201, 202 itself. Depending on the use, these two angles α and θ are predetermined by design considerations and by the process itself. These vortex generators need only be adapted in respect of length and height, as will be dealt with in detail further below with reference to FIG. 7.

In FIG. 4, the connecting edge 216 of the two side surfaces 211, 213 forms the downstream edge of the vortex generator 200. The edge 215 of the top surface 210 running transversely to the duct through which flow occurs is therefore the edge acted upon first by the duct flow.

FIG. 5 shows a so-called "half" vortex generator on the basis of a vortex generator according to FIG. 4. In the vortex generator 201 shown here, only one of the two side surfaces is provided with the sweepback angle α/2. The other side surface is straight and is orientated in the direction of flow. In contrast to the symmetrical vortex generator, only one vortex is produced here on the sweptback side, as symbolized in the figure. Accordingly, there is no vortex-neutral field downstream of this vortex generator; on the contrary, a complete swirl is imposed on the flow.

FIG. 6 differs from FIG. 4 inasmuch as the sharp connecting edge 216 of the vortex generator 202 here that point which is acted upon first by the duct flow. The element is accordingly turned through 180°. As apparent from the representation, the two oppositely directed vortices have changed their direction of rotation.

Figure 7:
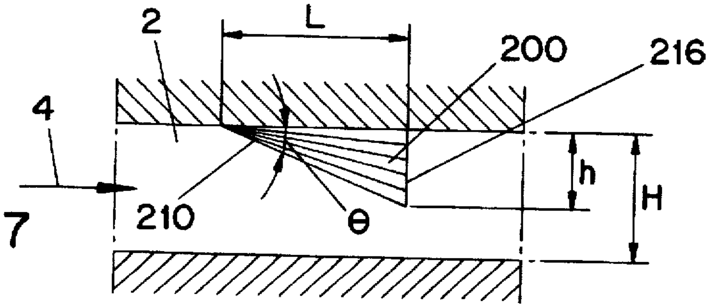
FIG. 7 shows a vortex generator in the mixing section.

FIG. 7 shows the basic geometry of a vortex generator 200 installed in the mixing section 2. As a rule, the height h of the connecting edge 216 will be coordinated with the duct height H or the height of the duct part which is allocated to the vortex generator in such a way that the vortex produced already achieves such a size directly downstream of the vortex generator 200 that the full duct height H is filled by it. This leads to a uniform velocity distribution in the cross-section acted upon. A further criterion which may bring an influence to bear on the ratio of the two heights h/H to be selected is the pressure drop which occurs when the flow passes around the vortex generator 200. It will be understood that the pressure-loss factor also increases at a greater ratio of h/H.

The vortex generators 200, 201, 202 are mainly and preferably used where it is a matter of mixing two flows with one another. The main flow 4 attacks as hot gases the transversely directed edge 215 or the connecting edge 216 in the arrow direction. The mixing air 8 (cf. FIG. 1) is of a quantity which is up to 50% and more of the main flow 4. In the present case, this mixing-air flow 8 is directed upstream and downstream of the vortex generators as well as through the vortex generators themselves into the main flow 4, as is particularly apparent from FIG. 1.

In the examples shown according to FIGS. 2 and 3, the vortex generators are placed flush with one another; these vortex generators may of course be distributed at a distance from one another over the periphery of the mixing section 2. The vortex to be produced is ultimately decisive for the selection of the geometry, number and arrangement of the vortex generators.

FIGS. 8–15 show further vortex generators having various configurations with regard to the passage openings or bores for the inflow of the mixing air into the main flow. These passages may alternatively also be used for introducing a further medium or another medium, for example a fuel, into the mixing section.

Figure 8:
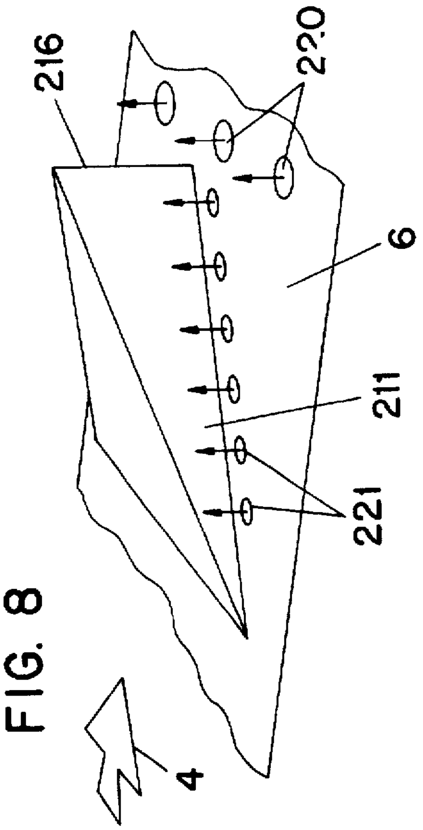
FIGS. 8–14 show variants of the feed of mixing air via the vortex generators.

FIG. 8 shows duct wall bores 220 which are located downstream of the vortex generators as well as further wall bores 221 which are located directly next to the side surfaces 211, 213 and in their longitudinal extent in the same duct wall 6 to which the vortex generators are fixed. The introduction of the mixing-air flow through the wall bores 221 gives the vortices produced an additional impulse and a cooling effect, which prolongs the life of the vortex generator.

Figure 10:
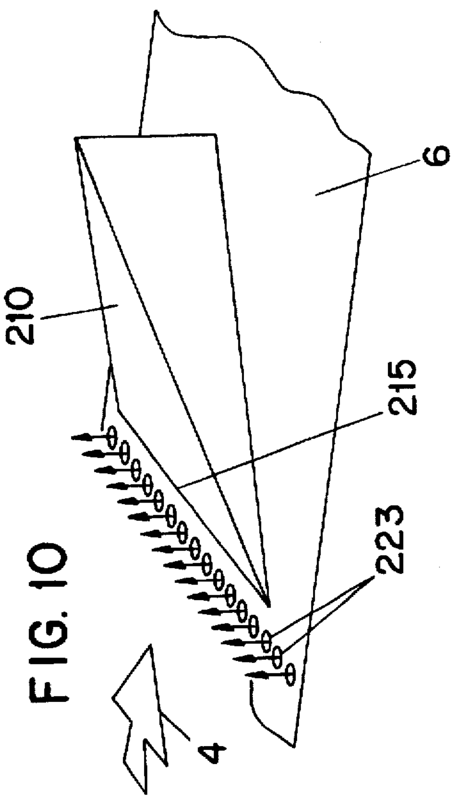
Figure 9:
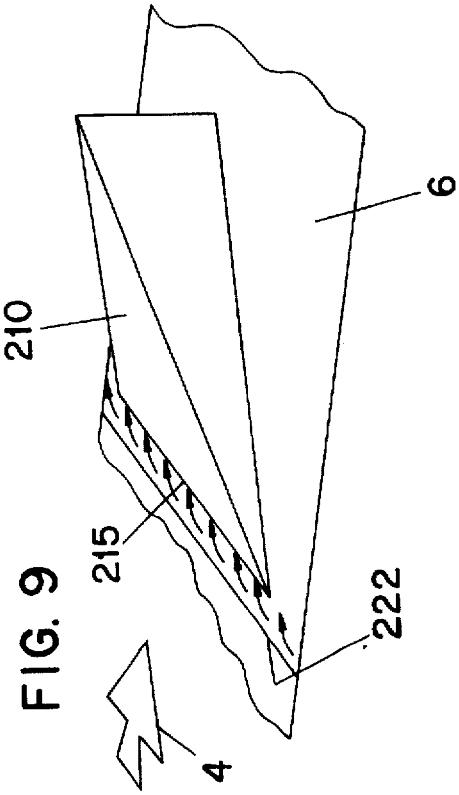

In FIGS. 9 and 10, the mixing-air flow is injected via a slot 222 or via wall bores 223, both arrangements being made directly in front of the edge 215 of the top surface 210 running transversely to the duct through which flow occurs, and in their longitudinal extent in the same duct wall 6 on which the vortex generators are arranged. The geometry of the wall bores 223 or of the slot 222 is selected in such a way that the mixing air, if need be another medium, is fed at a certain injection angle into the main flow 4 and, as a protective film, largely screens the subsequently placed vortex generator from the hot main flow 4 by flowing around the vortex generator.

In the examples described below, the mixing-air flow, as apparent from FIG. 1, is directed into the hollow interior of the vortex generators. The mixing mechanics aimed at relative to the main flow 4 as well as the cooling means for the vortex generators themselves, which is of the utmost importance, are thus provided without having to provide further measures.

The mixing-air flow may of course also be introduced with the aid of a combination of the means already described (FIGS. 8–10) and with the aid of the further means according to FIGS. 11–15 described below. To preserve a certain clarity, the through-openings with arrows in the various FIGS. 8–14 are only shown qualitatively, whereby it is easily possible for the relevant surfaces or all the surfaces of the vortex generators to be entirely provided with passage openings at a distance from one another, as apparent from FIG. 15.

Figure 11:
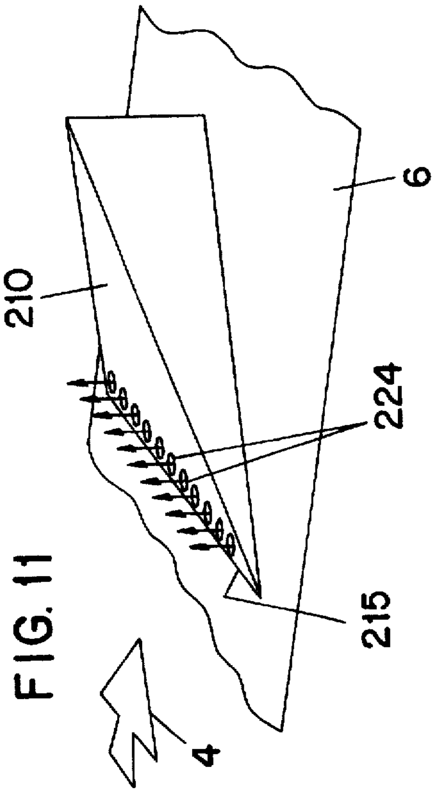

In FIG. 11, the mixing-air flow is injected via bores 224 which occupy the top surface 210, the inflow of the mixing-air flow taking place transversely to the duct through which flow occurs or to the edge 215. The cooling of the vortex generator is effected here externally to a greater extent than internally. The issuing mixing-air flow, when flowing around the top surface 210, develops at subcritical blow-out rate a protective layer screening the top surface 210 from the hot main flow 4; otherwise, at supercritical blow-out rate, the mixing action develops as described with reference to FIG. 1.

Figure 12:
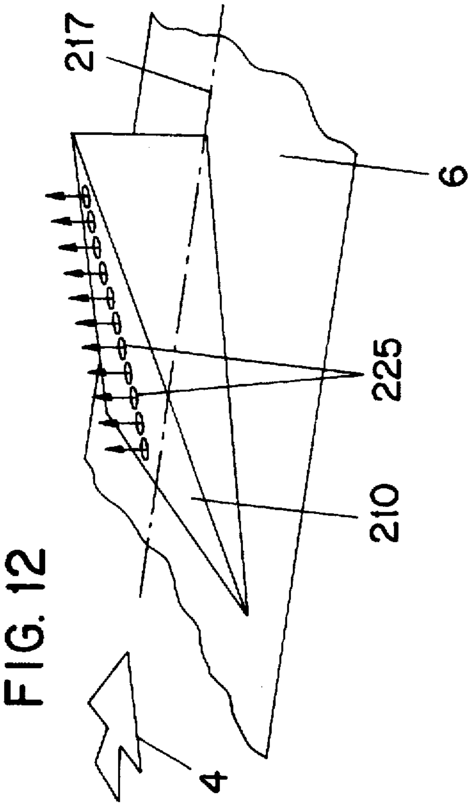

In FIG. 12, the mixing-air flow is injected via bores 225 which are arranged in an echelon inside the top surface 210 at least along the symmetry line 217. With this variant, the duct walls 6 are protected especially effectively from the hot main flow 4, since the mixing-air flow is introduced first of all at the outer periphery of the vortices.

Figure 13:
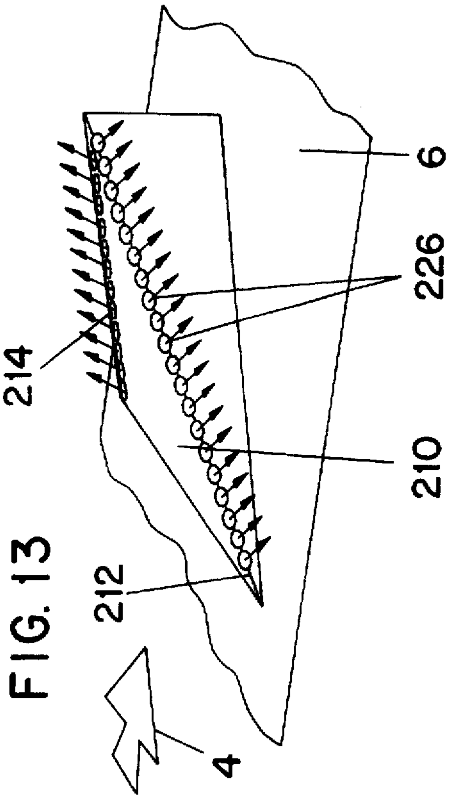

In FIG. 13, the mixing-air flow is injected via bores 226 which are located at least in the longitudinally directed edges 212, 214 of the top surface 210. This solution ensures effective cooling of the vortex generator, since the mixing-air flow issues at its extremities and thus passes completely around the inner walls of the element. The mixing-air flow is fed here directly into the developing vortex, which leads to defined mixing within the main flow at supercritical blow-out rate.

Figure 14:
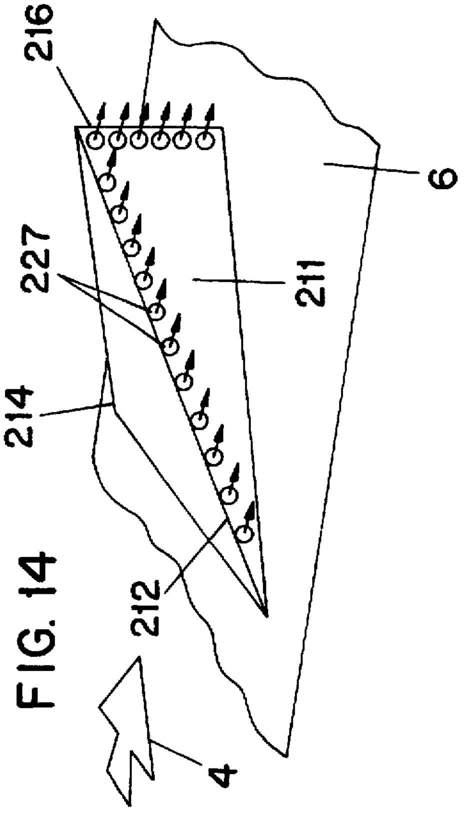

In FIG. 14, the mixing-air flow is injected via bores 227 which are located in the side surfaces 211 and 213, on the one hand in the region of the longitudinal edges 212 and 214, and on the other hand in the region of the connecting edge 216. This variant has a similar effect to that in FIG. 8 (bores 221) and in FIG. 13 (bores 226).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A combustion chamber, which comprises a wall enclosing a duct defining a primary combustion zone and a secondary combustion stage arranged downstream in the direction of flow, a mixing section being defined intermediately between the primary combustion zone and the secondary combustion stage, and a plurality of vortex generators mounted in the mixing section, and wherein the mixing section and vortex generators have passage openings for injecting mixing air into a main flow.

2. The combustion chamber as claimed in claim 1, wherein each vortex generator has three surfaces around which flow occurs freely, the surfaces having a longitudinal dimension extending in the direction of flow of the duct, a first surface forms a top surface and second and third surfaces form side surfaces, wherein the side surfaces are mounted with an edge flush with the wall of the duct and are relatively positioned to define between themselves a sweepback angle, wherein the top surface includes an edge running transversely to the flow direction which transverse edge bears against the wall adjacent to the mounted edges of the side surfaces, and wherein longitudinally directed edges of the top surface opposite the mounted edges and which are oriented at a setting angle ($\theta$) to the wall of the duct.

3. The combustion chamber as claimed in claim 2, wherein the two side surfaces, defining the sweepback angle ($\alpha$), of each vortex generator are arranged symmetrically around a symmetry axis.

4. The combustion chamber as claimed in claim 2, wherein the two side surfaces enclosing the sweepback angle are joined at a connecting edge which meets the longitudinally directed edges of the top surface at a point, and wherein the connecting edge is normal to the duct wall.

5. The combustion chamber as claimed in claim 4, wherein at least one of the connecting edge and the longitudinally directed edges of the top surface is acutely angled.

6. The combustion chamber as claimed in claim 2, wherein a symmetry axis of each vortex generator is parallel to a duct axis, wherein a connecting edge of the two side surfaces is positioned as a downstream edge of the vortex generator, and wherein the edge of the top surface running transversely to the duct is positioned as an edge acted upon first by the main flow.

7. The combustion chamber as claimed in claim 4, wherein the connecting edges of the plurality of vortex generators define a transition between the mixing section and the secondary combustion stage.

8. The combustion chamber as claimed in claim 2, wherein each vortex generator has passage openings formed over all surfaces and on an edge connecting the side surfaces.

9. The combustion chamber as claimed in claim 1, wherein a height of each vortex generator measured at a connected edge joining the side surfaces is selected relative to a height of the duct where the vortex generator is mounted so that a vortex produced fills the height of the duct where the vortex generator is mounted and fills a height of a portion of the duct directly downstream of the vortex generator.

10. The combustion chamber as claimed in claim 1, wherein the combustion chamber is an annular combustion chamber.

11. The combustion chamber as claimed in claim 1, wherein a section of the duct on an outflow side of the vortex generators is shaped as a venturi, and further comprising fuel injection means to inject fuel in a region of greatest constriction of the venturi-shaped section.

12. The combustion chamber as claimed in claim 1, wherein the duct is annular shaped, having radially inner and radially outer walls, and wherein said plurality of vortex generators is fixed at least to one of the inner and outer walls in the mixing section.

13. The combustion chamber as claimed in claim 1, wherein the primary zone is connected downstream of a fluid-flow machine and the secondary stage is connected upstream of a fluid-flow machine.

14. The combustion chamber as claimed in claim 13, wherein the fluid-flow machine connected downstream of the secondary stage is a turbine.

15. A method of operating a combustion chamber which comprises a flow duct having a primary combustion zone and a secondary combustion stage arranged downstream in the direction of flow for producing a main combustion flow, and an intermediate mixing section having a plurality of vortex generators mounted therein for producing vortices in the main combustion flow, the method comprising the steps of:

injecting mixing air in the mixing section into the main combustion flow with a quantity of the mixing air relative to the main combustion flow at supercritical injection rate so that the mixing air penetrates the vortices produced by the vortex generators, and injecting mixing air into the mixing section into the main combustion flow with a quantity relative to the main combustion flow at subcritical injection rate so that cooling is initiated at least along the mixing section.

16. The method as claimed in claim 15, wherein the mixing air is injected through passages in the vortex generators.

17. The method as claimed in claim 15, wherein in the supercritical range injected air penetrates the vortices in a region adjacent to walls of the flow duct.

* * * * *